United States Patent
Huang et al.

(10) Patent No.: US 7,724,765 B2
(45) Date of Patent: May 25, 2010

(54) METHOD AND APPARATUS FOR PROVIDING QUALITY OF SERVICE OVER A CONTENTION ACCESS PERIOD OF A WIRELESS PERSONAL AREA NETWORK

(75) Inventors: Yan Huang, Weston, FL (US); Lance E. Hester, Plantation, FL (US); Matthew R. Perkins, Sunrise, FL (US)

(73) Assignee: Motorola, Inc., Schaumburg, IL (US)

( * ) Notice: Subject to any disclaimer, the term of this patent is extended or adjusted under 35 U.S.C. 154(b) by 546 days.

(21) Appl. No.: 11/567,866

(22) Filed: Dec. 7, 2006

(65) Prior Publication Data

US 2008/0137684 A1     Jun. 12, 2008

(51) Int. Cl.
*H04L 12/413* (2006.01)
(52) U.S. Cl. .................. 370/445; 370/461; 370/469
(58) Field of Classification Search ......... 370/431–463, 370/229, 230, 230.1, 231, 235, 464, 465, 370/469
See application file for complete search history.

(56) References Cited

U.S. PATENT DOCUMENTS

| | | | |
|---|---|---|---|
| 6,970,422 B1 * | 11/2005 | Ho et al. ..................... | 370/230 |
| 7,079,508 B2 | 7/2006 | Ayyagari et al. | |
| 2002/0159544 A1 * | 10/2002 | Karaoguz .................. | 375/329 |
| 2003/0117984 A1 | 6/2003 | Gavette | |
| 2005/0141451 A1 * | 6/2005 | Yoon et al. ................. | 370/329 |
| 2005/0169296 A1 * | 8/2005 | Katar et al. ................ | 370/445 |
| 2007/0081490 A1 * | 4/2007 | Kim et al. ................... | 370/329 |
| 2007/0147249 A1 * | 6/2007 | Kumar ....................... | 370/235 |

OTHER PUBLICATIONS

W-H Liao, et al., "A TDMA-based bandwidth reservation protocol for QoS routing in a wireless mobile and hoc network," National Science Council of the Republic of China, Communication, ICC 2002, IEEE International Conference, pp. 3186-3190.
Mohamed Younis, et al., "On Handling QoS Traffic in Wireless Sensor Networks," Proceedings of the 37th Hawaii International Conference on System Sciences, 2004, IEEE 2004, pp. 1-10.
Blaine R. Copenheaver, "PCT/US2007/081611—PCT International Search Report and Written Opinion," WIPO, ISA/US, Commissioner for Patents, Alexandria, VA, USA, Apr. 3, 2008.
Ellen Moyse, "PCT/US2007/081611—PCT International Preliminary Report on Patentability," The International Bureau of WIPO, Geneva, Switzerland, Jun. 18, 2009.

* cited by examiner

*Primary Examiner*—Kwang B Yao
*Assistant Examiner*—Obaidul Huq

(57) ABSTRACT

A method and apparatus for providing quality of service over a contention access period of a wireless personal area network is provided herein. Particularly, the layers above the MAC are allowed to reserve portions of a contention access period (CAP) in order to schedule their QoS actions cooperatively thereby avoiding the dependence on the MAC for QoS performance. By using cooperative scheduling, a node can send a QoS packet from the QoS_Layer to the MAC, and know that it will be transmitted according to the specified QoS requirement. As a result, whenever a node sends a QoS packet in the reserved portion of the CAP, the channel will be guaranteed to be free from competing nodes' packets because those competing nodes will delay their transmissions based on the shared schedule.

18 Claims, 3 Drawing Sheets

100

100

METHOD AND APPARATUS FOR PROVIDING QUALITY OF SERVICE OVER A CONTENTION ACCESS PERIOD OF A WIRELESS PERSONAL AREA NETWORK

FIELD OF THE INVENTION

The present invention relates generally to ad-hoc communication systems and in particular, to a method and apparatus for providing quality of service over a contention access period of a wireless personal area network.

BACKGROUND OF THE INVENTION

The IEEE Low Rate Wireless Personal Area Network (LR-WPAN) Medium Access Control (MAC) standard 802.15.4 specifies a superframe structure that has a Beacon, Contention Access Period (CAP), and Contention Free Period (CFP). During the CAP, transmissions take place utilizing a Carrier Sense Multiple Access (CSMA) technique. In CSMA, if the channel is idle (i.e., no other transmissions are occurring), transmission can take place; otherwise, the device waits ("backs off") a random period of time and attempts to transmit again. Therefore, a device attempting to transmit is required to utilize a receiver to monitor the channel prior to transmission (i.e., to perform a "clear channel assessment," or CCA). Unlike transmissions in the CAP, transmissions in the CFP are contention free. Particularly, each node is assigned its own unique epoch, slot, or portion of the CFP to transmit within. No other nodes will be transmitting during a particular node's CFP, so transmissions may take place without CSMA.

Quality of Service (QoS) can be achieved using the CFP. However, sometimes it is also desirable to achieve QoS in the CAP of a superframe. For example, some systems (like neuRFon) using 802.15.4 may only support a CAP in order to reduce the code size of the MAC and/or to operate in very low-duty cycle operations. However, QoS cannot be guaranteed because the CAP uses Carrier Sense Multiple Access (CSMA), and therefore the time when a user can access the communication channel is unpredictable. An outstanding question for such systems that have communication sessions with time requirements is how to implement QoS over MACs that make use of CAPs or Beacons and CAPs solely without CFPs. Therefore, a need exists for a method and apparatus for providing quality of service over a contention access period of a wireless personal area network.

DETAILED DESCRIPTION OF THE DRAWINGS

In order to address the above-mentioned need, a method and apparatus for providing quality of service over a contention access period of a wireless personal area network is provided herein. Particularly, the layers above the MAC are allowed to reserve portions of the CAP in order to schedule their QoS actions cooperatively thereby avoiding the dependence on the MAC for QoS performance. By using cooperative scheduling, a node can send a QoS packet from the QoS_Layer to the MAC, and know that it will be transmitted according to the specified QoS requirement. As a result, whenever a node sends a QoS packet in the reserved portion of the CAP, the channel will be guaranteed to be free from competing nodes' packets because those competing nodes will delay their transmissions based on the shared schedule. Therefore, during Carrier Sense Multiple Access (CSMA) of the CAP, when a QoS packet is sent, a node will always sense a clear channel immediately and the packet will be sent without un-predictable delay.

The present invention encompasses a method for assuring a quality of service (QoS) in a system employing a contention access period. The method comprises the steps of employing a carrier sense multiple access (CSMA) technique to communicate within the whole contention access period, determining that another node has a QoS requirement, and reserving a portion of the contention access period for the other node's transmissions.

The present invention additionally encompasses a method for a node to assure quality of service (QoS) in a system employing a contention access period. The method comprises the steps of notifying a network of the QoS requirement, reserving a portion of the contention access period for transmissions only by the node, and transmitting within the reserved portion of the contention access period.

The present invention additionally encompasses a node comprising a transmitter notifying a network of a quality of service (QoS) requirement, logic circuitry reserving a portion of a contention access period for transmissions only by the node, and a transmitter transmitting within the reserved portion of the contention access period.

Figure 1:
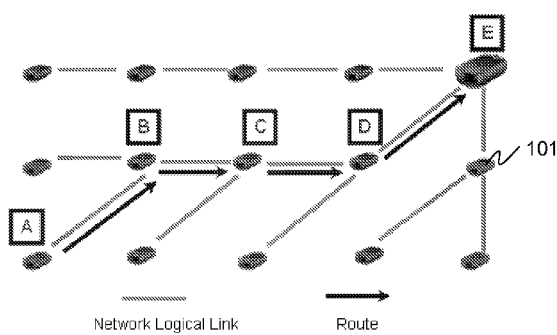
FIG. 1 is a block diagram of a communication system.

Turning now to the drawings, wherein like numerals designate like components, FIG. 1 is a block diagram of ad-hoc communication system 100. Communication system 100 preferably utilizes an ad-hoc communication system protocol defined by the 802.15.4 Low Rate Wireless Personal Area Network (LR-WPAN) MAC sub-layer for Low Data Rates or IEEE 802.15.3 High Rate Wireless Personal Area Network (HR-WPAN) MAC sub-layer. However, one of ordinary skill in the art will recognize that other communication system protocols may be utilized without varying from the scope of the invention. For example, communication system 100 may utilize communication system protocols defined above other MAC schemes, such as, but not limited to, 802.11 WLAN and Bluetooth™ standard (IEEE Standard 802.15.1). . . , etc. As shown, communication system 100 includes a number of nodes 101 (only one labeled in FIG. 1). Nodes 101 represent devices that communicate with each other through low-power, short range communication. Nodes 101 can be transportable (mobile) or they can be fixed in a given place.

As one of ordinary skill in the art will recognize, transmissions between two nodes 101 (only one node labeled in FIG. 1) within communication system 100 generally take place through intervening nodes, with the intervening nodes receiving a source transmission, and repeating, or relaying the source transmission until the source transmission reaches its destination node. Thus, a first node, wishing to transmit information to a second node located outside the transmission range of the first node, will have its transmissions pass through intervening nodes.

As discussed above, it is also desirable for QoS to be assured in the CAP of a superframe. Thus, assume there is a QoS packet to be sent from Node A to the gateway Node E. It would be desirable to achieve QoS for the packet on the whole route A->B->C->D->E.

Figure 2:
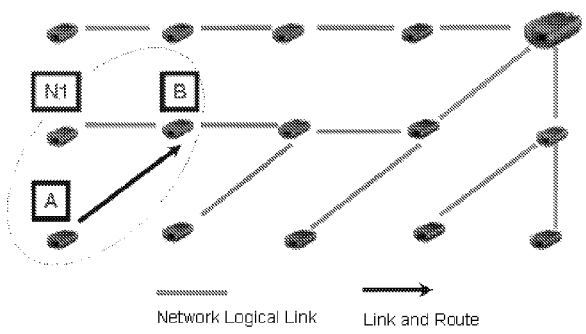
FIG. 2 illustrates the use of parent nodes in the communication system of FIG. 1.

Each node within communication system 100 will have a parent node associated with it. Within an ad-hoc network based on the IEEE 802.15.4 protocol, parent nodes periodically broadcast beacons to their children nodes. The children nodes always track their parent's beacon. All communications from a node must take pass through its parent node. FIG. 2 shows that Node B is the parent of Node A and N1. Therefore, nodes A and N1 listen to B's beacon every superframe. In a neuRFon system, the nodes circled in the ellipse are the ones that may compete in B's CAP; other competitions have been screened out because Node B establishes its own sub-superframe slot that does not overlap with all neighbors of these nodes. Note that in other network implementations working over the IEEE 802.15.4 MAC sub-layer, the competition in a certain CAP may involve more nodes. The described technique of providing QoS within the CAP also applies to those situations.

Figure 3:
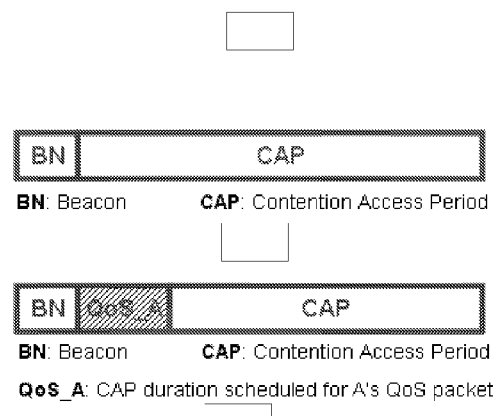
FIG. 3 shows a normal 802.15.4 superframe structure and an 802.15.4 superframe supporting QoS.

FIG. 3 shows a normal 802.15.4 superframe structure and an 802.15.4 superframe supporting QoS. Node B's normal superframe starts with Beacon (BN) followed by a complete CAP where all its children nodes use CSMA to access the channel during the CAP period. When Node A needs to send a QoS packet, the QoS layers of node B, A and N1 cooperatively schedule Node A to send its QoS packet in the duration at the beginning of the CAP, we call this time duration QoS_A, as highlighted in FIG. 3. As a result, only Node A's QoS_Layer will send the packet in this time duration, while Node B and N1's QoS_Layer guarantee there is no data sent to the MAC during QoS_A. Compared with applying QoS_A, a normal superframe contains a full CAP after the beacon that all nodes may compete for access to the channel anywhere throughout the duration of the CAP or it may not occur at all.

Thus, when node A has a QoS packet to send, it will notify the network of the QoS requirement. This may entail simply notifying its parent node, who will communicate this request to the necessary nodes, or it may entail notifying a network coordinator, who will communicate the request to the necessary nodes. The step of notifying the network of the QoS requirement comprises the step of notifying the network via a layer higher than a MAC sub-layer. Regardless of how the necessary nodes hear about the request, a portion (QoS_A in FIG. 3) of the CAP period will be reserved for transmissions only by node A. Node A will then transmit the QoS packet in the reserved portion of the CAP period using a CSMA technique. Additionally, other packets may be transmitted by Node A outside the CAP period using a CSMA technique.

It should be noted that in an alternate embodiment of the present invention, Node A may notify the network of how much of the CAP to reserve for its QoS transmission.

Nodes that hear other node's QoS request will employ a CSMA technique to communicate within the whole CAP until the request is heard. Once it has been determined by the node that another node has a QoS requirement, the node will reserve a portion of the CSMA period for the other node. A CSMA technique will be used to communicate in the CAP outside the reserved portion while holding off on transmitting within the reserved portion. Thus, transmissions will be delayed until after the reserved portion of the CAP has completed.

Figure 4:
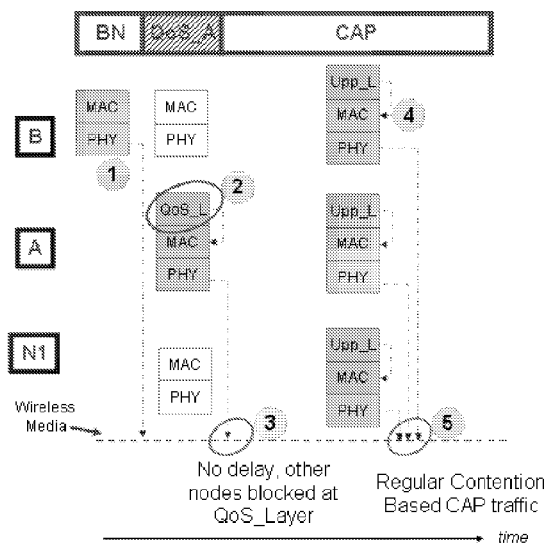
FIG. 4 illustrates a QoS transmission scheme in more detail by showing the activities of each layer in a given time duration in each superframe.

FIG. 4 illustrates the above scheme in more detail by showing the activities of each layer in a given time duration in each superframe. As shown in FIG. 4, each node has three layers: the QoS_Layer (QoS_L), MAC layer, and a physical (PHY) layer. The QoS_Layer is marked in the regular CAP duration as Upper_Layer (Upp_L) to make it clear that there is only regular traffic, but no QoS traffic in this time duration.

In each time duration (BN, QoS_A, and CAP), the active layers are displayed for each node. For example, at BN stage, only Node B's MAC and PHY layers are active because it is sending the Beacon, so only the MAC and PHY layer are drawn for Node B at BN stage. In addition, although a certain layer is active, there may not be any communications initiated by it. Therefore, the active layers that generate traffic are highlighted in grey while the layers without traffic are in white.

The description is given below corresponding to the numbered circles in the figure:

1. At BN stage, only Node B's MAC and PHY layers are active because it is sending the Beacon to the wireless media.
2. At QoS_A stage, the MAC and PHY layers of all nodes are active because they are in fact in a regular CAP stage. However, the QoS_Layer of only Node A is actively sending packet to the MAC because it is cooperatively scheduled by all nodes. Nodes B and N1's QoS_Layer delay all their packets sending at this stage. Therefore although their MAC and PHY layer are ready to send packets, there will not be any traffic sent to them from their QoS_Layer.
3. Node A's channel access can be guaranteed at QoS_A even though it is using CSMA, because it is the only one accessing the channel. This makes the channel access time predictable and therefore QoS achieved.
4. In the regular CAP duration, all layers of all nodes are active, including the Upper_Layer of all nodes. The Upper_Layer can send any packet to the node's MAC.
5. As a result, the channel access in regular CAP will involve competitions and collisions just as in any regular CSMA process.

Cooperative Scheduling:

The specific cooperative scheduling varies with different network protocols and applications. This section describes a possible cooperative scheduling process for the example above:

The step of reserving a portion of the contention access period may comprise negotiating with other nodes what portion of the contention access period is going to be reserved via a higher layer than a MAC sub-layer. For example, The QoS_Layer of Node A can send a request to parent B regarding its QoS session, e.g. the bandwidth needed, worst case completion time of delivering the packets, and the size of a QoS packet. Node B can decide the size of QoS_A slot in each superframe, when to start, and how many superframes are needed. It will announce this information to the QoS_Layer of Node A and N1. This information can even be implanted into the 802.15.4 Beacon payload so that the announcement can be received in time by other nodes (note implementing this into Beacon payload does not require any changes in the MAC sub-layer). When Nodes A and N1 receive this information, their QoS_Layer will operate as described above.

Figure 5:
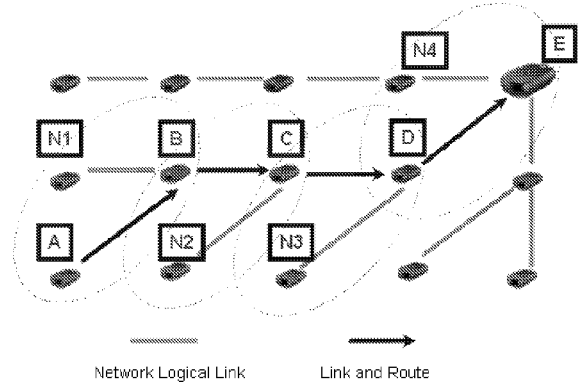
FIG. 5 illustrates a scenario of scheduling QoS on the whole route between a source node and a destination node.

Multi-Hop QoS Session:

This section describes how to conduct QoS in a multi-hop session in a neuRFon network. FIG. 5 shows the scenario of scheduling QoS on the whole route of A->B->C->D->E. Each hop involves a parent and its children, as shown in the elliptical/circular areas, including (B, A, N1), (C, B, N2), (D, C, N3), and (E, D, N4). Each circled area has a corresponding superframe setup by the parent node in the neuRFon network. The same method described for (B, A, N1) will be applied in each of these superframes to send QoS packet from A->B (QoS_A), B->C(QoS_B), C->D(QoS_C), and D->E (QoS_D).

In addition, to guarantee QoS from A to E, the cooperative scheduling will involve multiple hops. Node A needs to send a QoS session establishment request to Node E. Then, starting from Node E back to Node B, all parent nodes along the route will schedule the QoS packets in its own superframe, similar to what Node B did for Node A. When all the QoS durations (QoS_A, QoS_B, QoS_C, QoS_D) in the superframes are established, Node A can start sending the QoS packets to Node E.

Supplemental Information:

In order to guarantee Nodes B and N1 not to access the channel at QoS_A slot, they can neither initiate a data sending nor continue a previous unfinished data sending. Therefore, in addition to delay packet sending initialization at a scheduled QoS time slot, we also need to address how to avoid packet sending continuance from earlier superframes that can also interfere with QoS packet at MAC layer. More particularly, in 802.15.4, if a node cannot finish the back off process in a CAP period before the next Beacon, the MAC will hold the packet and continue the back off process in the CAP of the next superframe. This continuing back off needs to be prevented, otherwise node B or N1's MAC may still access the channel at QoS_A for a packet initiated in earlier superframe.

To avoid the unpredictable continuing backoff in 802.15.4, the upper layers of Nodes B, A, and N1 can do the following before an expected QoS session of Node A starts.

Finish all on-going packet sending to every node.

Temporarily modify a few MAC sub-layer parameters including maximal number of back off and maximal number of retries. These values should all be modified to 1. Note these can be implemented using commands sent to the MAC sub-layer from upper layers, so no change to the MAC sub-layer is needed.

Starting from the superframe before the very first QoS_A is scheduled (there can be one or more superframes to have QoS_A), a node's upper layer, before sending a non-QoS packet in regular CAP, will make sure the time left before the next Beacon is larger than the maximal possible time for one backoff attempt+Packet sending duration+Ack duration. As a result, if the channel is free after the first back off, the node can send a full packet in the CAP successfully before next Beacon. If the channel is not free after the first back off, the node's MAC sub-layer will quit from sending the packet immediately without further back off tries or further retries to send the packet in the MAC sub-layer. The upper layer above the MAC sub-layer should decide whether to resend the packet. If it decides to resend, the same process as for the prior tries will be used. Compared with resent by the MAC sub-layer, the upper layer can make sure a packet sending will not run into the next superframe. By applying this method, the unpredictable channel access caused by unfinished backoff in the next QoS_A can be avoided.

After a scheduled QoS session completes, the upper layers of all nodes will change these MAC parameters back to the normal values.

Figure 6:
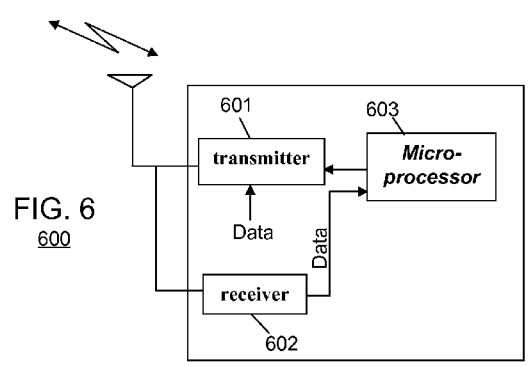
FIG. 6 is block diagram of a node that may be utilized as either a node sending a QoS packet or as a node preventing transmissions so others may send QoS packets.

FIG. 6 is block diagram of node 600 that may be utilized as either a node sending a QoS packet or as a node preventing transmissions so others may send QoS packets. As shown, node 600 comprises logic circuitry 603 (microprocessor 603), receive circuitry 602, and transmit circuitry 601. Logic circuitry 603 preferably comprises a microprocessor controller, such as, but not limited to a Freescale PowerPC microprocessor. In the preferred embodiment of the present invention logic circuitry 603 serves as means for controlling node 600, and as means for analyzing message content to determine any actions needed. Additionally receive and transmit circuitry are common circuitry known in the art for communication utilizing a well known communication protocol, and serve as means for transmitting and receiving messages. For example, receiver 602 and transmitter 601 are well known transmitters that utilize the IEEE 802.15.4 communication system protocol.

Figure 7:
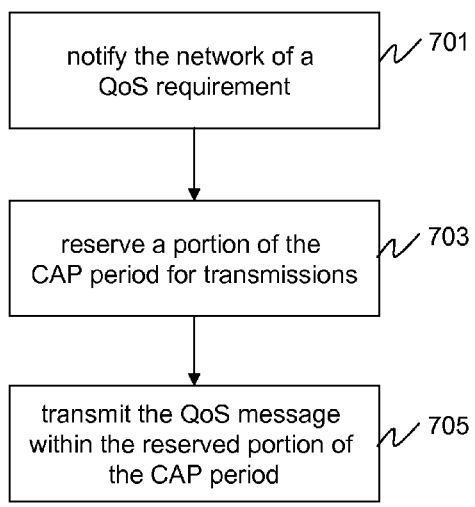
FIG. 7 is a flow chart showing operation of the node of FIG. 6 when the need arises to transmit a QoS packet.

FIG. 7 is a flow chart showing operation of node 600 when the need arises to transmit a QoS packet. The logic flow begins at step 701 where logic circuitry 603 instructs transmitter 601 to notify the network of the QoS requirement. As discussed above, this may entail simply transmitting a message the parent node, who will communicate this request to the necessary nodes, or it may entail notifying a network coordinator, who will communicate the request to the necessary nodes. Regardless of how the necessary nodes hear about the request, logic circuitry 603 will reserve a portion of the CAP period for transmissions (step 703). Finally, at step 705 logic circuitry 603 will instruct transmitter 601 to transmit the QoS message within the reserved portion of the CAP period.

Figure 8:
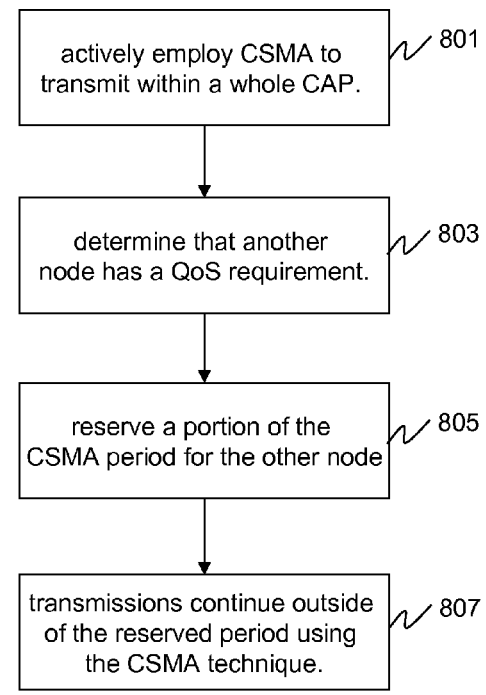
FIG. 8 is a flow chart showing operation of the node of FIG. 6 when another nodes QoS request is received.

FIG. 8 is a flow chart showing operation of node 600 when another node's QoS request is received. The logic flow begins at step 801 where logic circuitry 603 actively employs transmitter 601 to use a contention-based medium access technique to communicate within the whole contention access period. In one embodiment, this access technique comprises a CSMA technique. At step 803 logic circuitry 603 determines that another node has a QoS requirement. This determination may come as a received message (received by receiver 602). At step 805, logic circuitry 603 reserves a portion of the CSMA period for the other node. Finally, transmissions continue outside of the reserved period using the CSMA technique.

While the invention has been particularly shown and described with reference to a particular embodiment, it will be understood by those skilled in the art that various changes in form and details may be made therein without departing from the spirit and scope of the invention. It is intended that such changes come within the scope of the following claims.

The invention claimed is:

1. A method for a node to assure a quality of service (QoS) in a communication system that only employs a contention access period for transmissions, the method comprising the steps of:

the node only employing a contention-based medium access technique to communicate within the whole contention access period without employing a contention free period for communications;

the node determining that another node has a QoS requirement via the reception of a notification only on a layer higher than a MAC sub-layer such that layers above the MAC layer are used to reserve portions of the contention access period; and the node reserving a portion of the contention access period for the other node's transmissions.

2. The method of claim 1 wherein the contention-based access technique comprises a carrier sense multiple access (CSMA) technique.

3. The method of claim 1 further comprising the step of:
the node employing the CSMA technique to communicate in the contention access period outside the reserved portion of the contention access period while holding off on transmitting within the reserved portion of the contention access period.

4. The method of claim 1 wherein the step of reserving the portion of the contention access period comprises the steps of:
delaying a transmission until after the reserved portion of the contention access period has completed.

5. The method of claim 1 wherein the step of employing the CSMA technique to communicate comprises the step of transmitting when a channel is idle otherwise backing off a random period of time before attempting to transmit again.

6. The method of claim 1 wherein the step of determining that another node has the QoS requirement comprises the step of receiving a message indicating that the other node has the QoS requirement.

7. The method of claim 1 wherein the contention access period comprises a period of time where nodes utilize the CSMA technique to communicate.

8. A method for a node to assure quality of service (QoS) in a system employing only a contention access period, the method comprising the steps of:
notifying a network of the QoS requirement;
reserving a portion of the contention access period for transmissions only by the node; and
transmitting within the reserved portion of the contention access period,
wherein the step of notifying the network of the QoS requirement comprises the step of notifying the network only via a layer higher than a MAC sub-layer, and wherein the system only employs a contention access period for communications without employing a contention free period for communications.

9. The method of claim 8 wherein the step of transmitting within the reserved portion of the contention access period comprises the step of transmitting utilizing a carrier sense multiple access (CSMA) technique.

10. The method of claim 9 wherein CSMA technique comprises transmitting when a channel is idle otherwise backing off a random period of time before attempting to transmit again.

11. The method of claim 8 wherein the step of notifying comprises the step of additionally notifying the network how much of the contention access period to reserve.

12. The method of claim 8 further comprising the step of:
transmitting outside the contention access period using the CSMA technique.

13. The method of claim 8 wherein the step of reserving a portion of the contention access period comprises the step of negotiating with other nodes what portion of the contention access period is going to be reserved via a higher layer than a MAC sub-layer.

14. The method of claim 8 wherein the step of notifying the network comprises the step of transmitting a message notifying the network.

15. A node within a communication system, the node comprising:
a transmitter notifying a network of a quality of service (QoS) requirement, wherein the transmitter notifies the network of the QoS requirement only via a layer higher than a MAC sub-layer, and wherein the communication system only employs a contention access period for communications without employing a contention free period for communications;
logic circuitry reserving a portion of a contention access period for transmissions only by the node; and a transmitter transmitting within the reserved portion of the contention access period.

16. The node of claim 15 wherein the transmitter transmits within the reserved portion of the contention access period utilizing a carrier sense multiple access (CSMA) technique.

17. The node of claim 16 wherein the CSMA technique comprises transmitting when a channel is idle otherwise backing off a random period of time before attempting to transmit again.

18. The node of claim 15 wherein the transmitter additionally transmits outside the contention access period using the CSMA technique.

* * * * *